United States Patent [19]

Fitzgerald, Jr.

[11] 3,878,326

[45] Apr. 15, 1975

[54] VOLTAGE SUPPLY SYSTEM

[75] Inventor: William Vincent Fitzgerald, Jr., Carmel, Ind.

[73] Assignee: RCA Corporation, New York, N.Y.

[22] Filed: Feb. 27, 1974

[21] Appl. No.: 446,456

[52] U.S. Cl.......... 178/7.3 R; 178/DIG. 11; 325/492

[51] Int. Cl. .......... H04n 3/16

[58] Field of Search.... 178/7.3 R, 7.3 DC, DIG. 11; 325/492; 328/260; 307/150

[56] References Cited

UNITED STATES PATENTS 2,796,520 6/1957 Kreithen .......... 178/7.3 R

*Primary Examiner*—Robert L. Griffin
*Assistant Examiner*—Robert Hearn
*Attorney, Agent, or Firm*—Eugene M. Whitacre; Paul J. Rasmussen

[57] ABSTRACT

A horizontal deflection system derived power supply for a television receiver operable from either alternating current line voltage or from a substantially lower voltage direct current voltage source such as a 12 volt battery includes means for disabling a portion of the supply when the receiver is operable in the low direct current voltage source mode and supplying power from the low direct current voltage source. Power losses incurred in converting the low direct current voltage into alternating current voltage and then rectifying the alternating current voltage to produce supplies at the source voltage are thereby eliminated.

8 Claims, 7 Drawing Figures

T5117

VOLTAGE SUPPLY SYSTEM

BACKGROUND OF THE INVENTION

This invention relates to horizontal deflection systems operable either from alternating current line voltage or from storage batteries.

In a portable television receiver capable of being operated from an alternating current line voltage supply or alternatively from a battery supply, the deflection system direct current operating voltage typically is supplied through a winding of the horizontal output transformer for supplying operating current to the horizontal output stage which usually includes a power transistor. Current flow in a primary winding of the horizontal output transformer as the horizontal deflection system operates induces voltage variations in secondary windings of the horizontal output transformer. The induced voltage variations may be rectified and filtered to supply additional direct current operating potentials to other receiver circuits.

When the receiver is operated in the battery mode, additional direct current operating potentials are supplied to other receiver circuits in the same manner, voltage variations being induced in secondary windings of the horizontal output transformer by current flow in the horizontal output transformer primary winding by the action of the horizontal deflection system. These voltage variations are rectified and filtered to create direct current voltage supplies at other potentials for other receiver circuits.

Thus, it may be seen that regardless of whether the receiver is being operated in the alternating current line mode or in the battery mode, power continues to be derived from these secondary windings and losses resulting from current flow through the resistance of the secondary windings continue to occur. However when the receiver is operating in the battery mode, avoidance of such losses is a primary consideration since any unnecessary loss incurred in operation in the battery mode will result in decreased operating time by virtue of the additional power drain on the battery.

Ideally a system should be developed which would minimize power losses in the secondary windings when the receiver is operating in the battery mode. Additionally, such a system would allow for the supply of power for other receiver circuits from the secondary windings when the receiver is operating in the alternating current line mode since in the alternating current line mode such losses are less critical to the operation of the receiver than they are when the receiver is being operated in the battery supply mode.

SUMMARY OF THE INVENTION

In accordance with the invention a television receiver operable alternatively from a first source of alternating current line derived voltage or from a second substantially lower voltage direct current voltage source includes a direct current voltage supply system comprising a deflection generator, a first winding, rectifying means, filtering and storage means, and switching means. The first winding is coupled to the deflection generator for having voltage variations induced thereacross in response to current flow in the deflection generator. The rectifying means are coupled to the winding for rectifying the voltage variations. The filtering and storage means are provided for filtering and storing the rectified voltage variations and the switching means are provided for coupling the winding and rectifying means to the filtering and storage means when the receiver is operable from the first voltage source for providing at a terminal of the filtering and storage means a direct current voltage substantially equal to the second voltage for supplying this direct current voltage. The switching means are switchable for coupling the second voltage source to the winding and rectifying means when the receiver is operable from the second voltage source for biasing the rectifying means for preventing the rectification of the voltage variations induced in the winding for inhibiting current flow in the winding thereby preventing power losses in the winding due to current flow therein.

The invention may best be understood by referring to the following description and accompanying drawings of which:

FIG. 1 is a schematic diagram of a deflection system embodying the invention; and FIGS. 2*a*–2*f* illustrate waveforms obtained at various points in the diagram of FIG. 1.

DESCRIPTION OF THE PREFERRED EMBODIMENT

Figure 1:
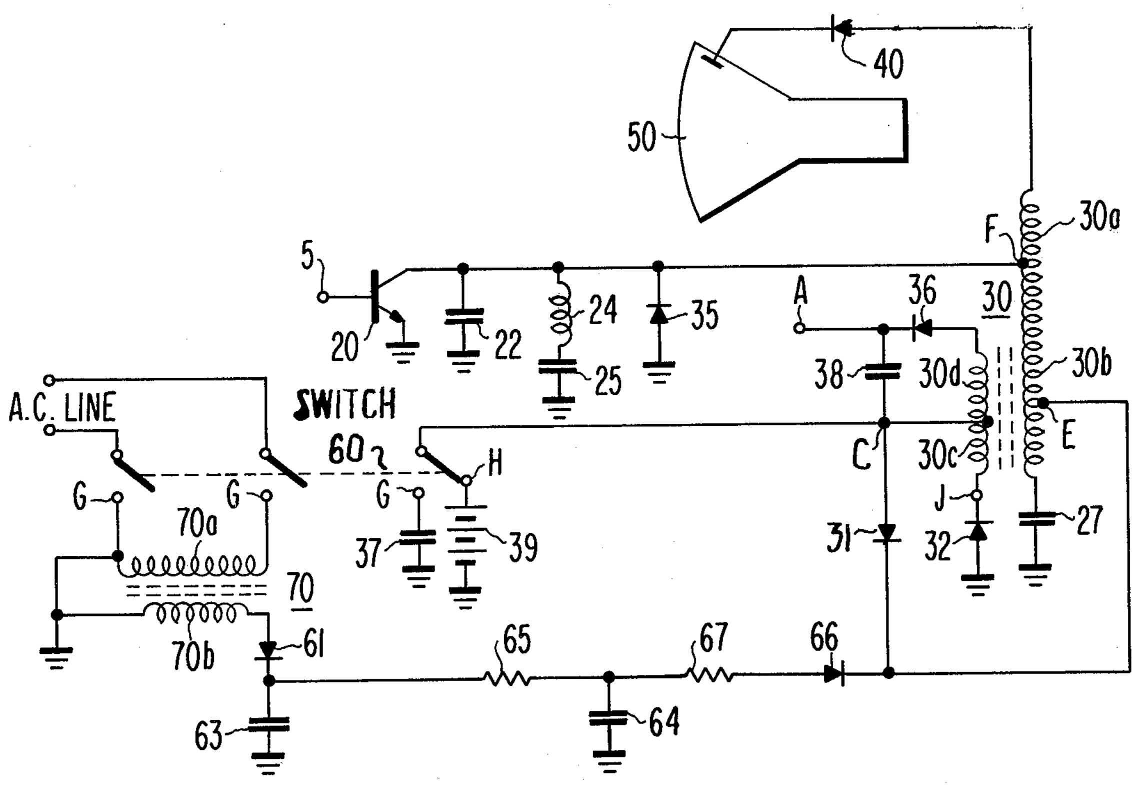
Figure 2A:
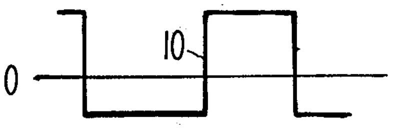

In a preferred embodiment of the invention illustrated in the FIG. 1, a horizontal deflection rate signal 10 illustrated in FIG. 2*a* is coupled to a base electrode 5 of a horizontal deflection output transistor 20. The emitter of transistor 20 is coupled to ground and its collector is coupled to the cathode of a damper diode 35, to a terminal of a retrace capacitor 22, to a terminal of a horizontal deflection winding 24 and to a terminal F of a winding 30*b* of a horizontal output transformer 30. The anode of damper diode 35 is coupled to ground. The remaining terminal of retrace capacitor 22 is coupled to ground and the remaining terminal of deflection winding 24 is coupled to a terminal of an S-shaping capacitor 25 the remaining terminal of which is coupled to ground. The remaining terminal of winding 30*b* is coupled to a terminal of a direct current blocking capacitor 27, the remaining terminal of which is coupled to ground.

One terminal of a primary winding 70*a* of a step-down transformer 70 is coupled to ground. The ground terminal of primary winding 70a is also coupled to one terminal of a switch 60 which, when switch 60 is placed in a position G, is coupled to the ground terminal of the alternating current line. The remaining terminal of winding 70*a* is coupled to a terminal of switch 60 which, when switch 60 is placed in position G, is coupled to the remaining terminal of the alternating current line. A secondary winding 70*b* of step-down transformer 70 has one of its terminals coupled to ground. The remaining terminal of winding 70*b* is coupled to the anode of a rectifying diode 61.

The cathode of diode 61 is coupled to a terminal of a storage capacitor 63 the remaining terminal of which is coupled to ground. The cathode of diode 61 is also coupled to a terminal of a filter resistor 65. The remaining terminal of resistor 65 is coupled to a terminal of a filter capacitor 64 and a terminal of a current limiting resistor 67. The remaining terminal of capacitor 64 is coupled to ground. The remaining terminal of resistor 67 is coupled to the anode of a blocking diode 66, the cathode of which is coupled to a point E on winding 30*b*.

A high voltage winding 30*a* of horizontal output transformer 30 is coupled at one terminal to terminal F. The remaining terminal of high voltage winding 30*a* is coupled to the anode of a high voltage rectifier diode 40. The cathode of high voltage rectifier 40 is coupled to a kinescope 50.

A winding portion 30c and a winding portion 30d comprise a secondary winding of transformer 30. Winding portion 30*c* of horizontal output transformer 30 has one of its terminals coupled to the cathode of a rectifier diode 32. The anode of diode 32 is coupled to ground. Terminal C, the remaining terminal of winding portion 30*c*, is coupled to another terminal of switch 60. A storage capacitor 37 is coupled between another terminal of switch 60 and ground potential. Another terminal of switch 60 is coupled to the positive terminal of a battery 39, the negative terminal of which is coupled to ground.

Terminal C is also coupled to the anode of a blocking diode 31 the cathode of which is coupled to point E of winding 30*b*. Winding portion 30*d* of horizontal output transformer 30 has one of its terminals coupled to point C and a remaining terminal coupled to the anode of a rectifying diode 36. The cathode of diode 36 is coupled at terminal A to a terminal of a storage capacitor 38. The remaining terminal of capacitor 38 is coupled to point C.

The operation of the horizontal deflection system of FIG. 1 from alternating current line voltage occurs when switch 60 is in position G. When the switch is in that position, point C is coupled across storage capacitor 37 to ground and the alternating current line is coupled across primary winding 70*a* of step-down transformer 70. Stepped-down voltage variations at the alternating current line frequency are coupled to the anode of rectifier diode 61. Half-wave rectified line voltage potential is stored in capacitor 63. Direct current operating voltage is supplied through filter resistor 65 to a second filtering and storage capacitor 64. Capacitor 64 provides direct current operating voltage at substantially the potential of battery 39 through current limiting resistor 67 and forward biased blocking diode 66 to terminal E of horizontal output transformer winding 30*b*. Resistor 67 protects horizontal output transformer 30 against excessive current in the event of arcing from the anode of kinescope 50 to ground.

Figure 2B:
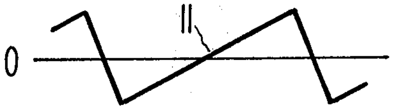

During the first portion of the horizontal deflection trace interval, horizontal deflection output transistor 20 is held in cutoff by the negative-going portion of voltage waveform 10 of FIG. 2*a* coupled to point 5, the base of transistor 20. Current flows from the direct current voltage supply comprising elements 70, 61, 63, 65, 66, 64, and 67 through winding 30*b* of horizontal output transformer 30 and horizontal deflection winding 24 to charge S-shaping capacitor 25. An approximately linear decreasing current in a first direction through horizontal deflection winding 24 results as shown by waveform 11 of FIG. 2*b*, the current through winding 24, as capacitor 25 charges through the inductance of windings 30*b* and 24 from the substantially constant direct current voltage supply coupled to terminal E. At approximately the middle of the horizontal deflection trace interval, transistor 20 is driven into saturation by the positive-going portion of waveform 10 of FIG. 2*a*, the voltage applied to the base of transistor 20. As transistor 20 begins to conduct through its collector-emitter path, the flow of current in deflection winding 24 reverses and begins to increase in a second direction in an approximately linear fashion shown by waveform 11 of FIG. 2b as S-shaping capacitor 25 begins to discharge through winding 24 and the collector-emitter path of transistor 20.

S-shaping capacitor 25 continues to discharge in a substantially linear manner through deflection winding 24 until the end of the horizontal deflection trace interval when the negative-going portion of waveform 10 of FIG. 2*a* drives transistor 20 into cutoff. As current abruptly ceases flowing in transistor 20, the current through deflection winding 24 begins to decrease in the second direction toward zero as waveform 11 of FIG. 2*b* indicates. The rapid turning off of transistor 20 marks the beginning of the horizontal deflection retrace interval. As transistor 20 is turned off, the current which had previously flowed to ground through it begins to charge retrace capacitor 22 as energy is transferred to capacitor 22 from the magnetic fields established by the trace interval currents in windings 24 and 30*b*.

Figure 2C:
Figure 2D:
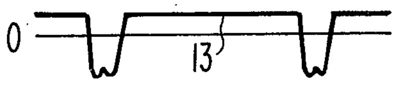
Figure 2E:
Figure 2F:
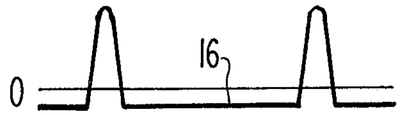

The voltage at point E, which is clamped at the voltage at the junction of blocking diodes 31 and 66 during the trace interval as shown by waveform 14 of FIG. 2*e*, rises during the retrace interval as point E is decoupled from the direct current operating potential supply by virtue of the now reverse biased diodes 31 and 66. Point F similarly rises from its approximately zero trace interval voltage to a high positive value with repsect to ground, as shown by waveform 12 of FIG. 2*c* as the energy recovered from windings 24 and 30*b* is now transferred to retrace capacitor 22. The retrace pulse voltage at the junction of high voltage winding 30*a* and high voltage rectifier 40 also rises to a peak positive value with respect to ground illustrated in waveform 16 of FIG. 2*f* and is rectified in rectifier 40 to supply high voltage to kinescope 50.

Retrace capacitor 22 then begins to discharge, transferring energy back into horizontal deflection winding 24 and horizontal output transformer 30 re-establishing magnetic fields therein. As retrace capacitor 22 discharges completely ending a first half-cycle of oscillation with the inductance of winding 24 and horizontal output transformer 30, the deflection retrace interval ends. Damper diode 35 becomes forward biased by virtue of the approximately zero voltage with respect to ground at point F illustrated in waveform 12, and begins to conduct current thereby clamping point F to ground potential to which the anode of diode 35 is coupled. At this time the next succeeding horizontal deflection trace interval begins.

The voltage waveforms induced across winding 30*b* cause voltage waveform 13 of FIG. 2*d* to appear across windings 30*c* and 30*d*. Winding portions 30c and 30d are coupled for providing trace rectified voltage which is the positive-going portion of waveform 13 of FIG. 2*d* at points C and A. Diode 32 is the rectifier for providing the trace rectified voltage of the positive-going portion of waveform 13 of FIG. 2d at point C. A positive-going pulse for other television receiver functions such as automatic gain control or automatic frequency control may also be derived from point J, the cathode of diode 32. The rectified voltage appearing across winding 30*c* is stored in storage capacitor 37 which is used to provide direct current voltage to other television receiver circuits. The voltage appearing across winding 30*d* is rectified by doide 36 and is stored in capacitor 38 and provides an additional direct current operating voltage supply for other receiver circuits. The rectified voltage stored in capacitor 38 is boosted by the voltage existing at point C whether the receiver is in the battery or alternating current line mode of operation, i.e. whether switch 60 is in position H or in position G.

When the receiver of FIG. 1 is disconnected from the alternating current line voltage supply by placing switch 60 in position H, capacitor 37 is disconnected from circuit and direct current operating potential is supplied to the horizontal deflection system from battery 39 through diode 31. The direct current operating voltage supplied by battery 39 is substantially the same as that supplied by the rectified and filtered step-down transformer supply obtained from winding 70*b*. The voltage is supplied to the same point, point E, on winding 30*b*.

The operation of the horizontal deflection system from battery supply 39 differs from the operation of the system from the rectified and filtered step-down transformer supply in that winding portion 30*c* is selected so that, when switch 60 is in the H position corresponding to battery operation, the voltage variations induced in winding 30*c* are less than the voltage required to forward bias rectifier diode 32. Therefore, no current will flow in winding 30*c* during the trace interval and as a result no power will be derived therefrom. Since no current flows in winding 30*c* during the trace interval, there will preventing no power losses due to current flow through the resistance of winding 30*c*. Rather, the voltage supplied to point C for the operation of other receiver circuits will be supplied from battery 39. The voltage developed across capacitor 38 is then added to the battery voltage to develop the voltage at point A with respect to ground. Since all of the power to operate the receiver in the battery mode must come from battery 39 in any event, the decrease in the number of resistive components in the deflection system achieved by reverse biasing diode 32 and priventing power dissipation in winding portion 30*c* will result in increasing the operating time of the receiver in the battery mode before recharging of battery 39 is required.

Thus, it may be seen that with the disclosed system less power is required to be removed from the horizontal deflection system when it is operating from the battery supply to produce desired operating voltages at points C and A for other receiver circuits. This result is accomplished by essentially disabling winding 30*c* of the horizontal output transformer which is used to generate one of these voltages, the voltage at point C, and supplying the voltage directly from the battery thereby eliminating the transformer losses which occur when direct current operating voltage is supplied to point C from winding 30*c*. This voltage may then be boosted by rectifying the voltage variations appearing across winding 30*d* as disclosed herein to supply other direct current operating potentials to other receiver circuits. Transformer losses incurred in generating rectified voltage at terminal C are avoided. Avoidance of such losses is of course a primary consideration when operating the receiver from the battery supply.

What is claimed is:

1. In a television receiver operable alternatively from a first source of alternating current line derived voltage or from a second substantially lower voltage direct current voltage source, a direct current voltage supply system comprising:

a deflection generator;

a first winding coupled to said deflection generator for having voltage variations induced thereacross in response to current flow in said deflection generator;

rectifying means coupled to said winding for rectifying said voltage variations;

filtering and storage means for filtering and storing said rectified voltage variations; and switching means for coupling said winding and rectifying means to said filtering and storage means when said receiver is operable from said first voltage source for providing at a terminal of said filtering and storage means a direct current voltage substantially equal to said second voltage for supplying said direct current voltage, said switching means switchable for coupling said second voltage source to said winding and rectifying means when said receiver is operable from said second voltage source for biasing said rectifying means for preventing the rectification of said voltage variations induced in said winding for inhibiting current flow in said winding for preventing power losses in said winding due to current flow therein.

2. An operating voltage supply system according to claim 1 wherein:

said deflection system is a horizontal deflection system and said transformer is a horizontal output transformer;

said winding is a secondary winding of said horizontal output transformer;

said rectifying means is a diode serially coupled to said secondary winding; and said filtering and storage means is a capacitor.

3. An operating voltage supply system according to claim 1 wherein:

said switching means is switchable for coupling said second voltage source across the serial combination of said rectifying means and said winding and said voltage variations induced across said winding do not exceed the sum of the voltage supplied by said second voltage source and the forward bias voltage necessary to render said rectifying means conductive thereby inhibiting current flow in said winding when said receiver is operable from said second voltage source.

4. In a television receiver operable alternatively from a first source of alternating current line derived voltage or from a second substantially lowr voltage direct current voltage source, a direct current voltage supply system for supplying operating voltage for said receiver comprising:

a deflection system including an output transformer, a winding thereof having voltage variations induced thereacross in response to current flow in said deflection system;

rectifying means coupled to said winding for rectifying said voltage variations;

capacitance means for filtering and storing said rectified voltage variations; and switching means for coupling said rectifying means and said winding serially across said capacitance means when said receiver is operable from said first voltage source for providing at a terminal of said capacitance means a direct current voltage supply for providing operating voltage for said receiver, said switching means switchable for coupling said second voltage source to said serially coupled rectifying means and winding when said receiver is operable from said second voltage source for biasing said rectifying means for preventing the rectification of said voltage variations induced in said winding for inhibiting current flow in said winding for preventing losses in said winding due to current flow therethrough.

5. A dual mode voltage supply system, comprising:
a deflection current generator;
first and second terminals adapted to be coupled to first and second sources of direct current voltage, respectively;
a transformer including first, second and third windings, said first winding having one end thereof coupled to said deflection current generator;
switching means selectively operable in a first position for coupling said first terminal through a first path through said first winding to said generator, or in a second position for coupling said second terminal through a second path through said first winding to said generator;
means for coupling said second and third windings in series and for adding the voltages derived therefrom during operation of said generator when said switching means is in said first position; and
means for coupling said second terminal to the junction of said second and third windings and for disabling the voltage obtained from said second winding and substituting the voltage obtained from said second terminal therefor when said switching means is in said second position.

6. A dual mode voltage supply system according to claim 5 wherein said first and second sources of voltage are a source of rectified and filtered alternating current line derived voltage and a battery respectively.

7. A dual mode voltage supply system according to claim 5 wherein said second path includes a blocking diode the anode of which is coupled to said second terminal and the cathode of which is coupled to said first winding when said switching means is in said second position.

8. A dual mode voltage supply system according to claim 5 wherein said deflection current generator is a horizontal deflection generator and said transformer is a horizontal output transformer.

* * * * *

UNITED STATES PATENT OFFICE

CERTIFICATE OF CORRECTION

PATENT NO. : 3,878,326

DATED : April 15, 1975

INVENTOR(S) : William Vincent Fitzgerald, Jr.

It is certified that error appears in the above-identified patent and that said Letters Patent are hereby corrected as shown below:

Column 5, line 29, that portion reading "there will preventing no" should read -- there will be no --. Column 5, line 39, that portion reading "priventing" should read -- preventing --. Column 6, line 50, that portion reading "lowr" should read -- lower --.

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*